United States Patent [19]

Stratton

[11] Patent Number: 5,273,179

[45] Date of Patent: Dec. 28, 1993

[54] VCR COVER

[76] Inventor: James M. Stratton, 2624 Timmons, Wyoming, Mich. 49509

[21] Appl. No.: 945,696

[22] Filed: Sep. 16, 1992

[51] Int. Cl.⁵ .................. B65D 45/16; E05B 73/00
[52] U.S. Cl. ................................ 220/326; 70/14; 70/58; 360/137
[58] Field of Search .............. 220/326; 70/14, 58, 70/158, 163; 360/137; 292/241, 240

[56] References Cited

U.S. PATENT DOCUMENTS

| | | | |
|---|---|---|---|
| 4,527,405 | 7/1985 | Renick et al. | 70/4 |
| 4,655,057 | 4/1987 | Derman | 70/58 X |
| 4,901,879 | 2/1990 | Clemente, Jr. | |
| 4,908,728 | 3/1990 | Pinkett | 70/163 X |
| 5,156,027 | 10/1992 | Reusch | 70/14 |

OTHER PUBLICATIONS

"Protects VCR from Kids" Author unknown.

Primary Examiner—Allan N. Shoap
Assistant Examiner—Paul A. Schwarz
Attorney, Agent, or Firm—Bullwinkel Partners

[57] ABSTRACT

A child resistant VCR cover comprises a cover plate having ribs for locating the cover within the video cassette door, a pair of cams which lock the cover in place, grips for rotating the cams, and springs for biasing the cams against the cover plate. The cover is installed by pushing and turning simultaneously the two grips. Each cam has a bevelled surface and acts in a screwlike fashion to engage the interior surface of the VCR frontplate, thereby locking the cover in place. To release the cover, the grips are pushed and rotated until the cams no longer engage the interior side of the VCR frontplate.

6 Claims, 1 Drawing Sheet

VCR COVER

BACKGROUND OF THE INVENTION

In recent years the video cassette recorder, or VCR, has become almost as common a household appliance as the television set. Typically, VCRs are used to record television programs for later play back, or to play prerecorded video cassettes. VCRs generally are equipped with a door or slot into which the video cassettes are inserted. The door or slot is located on the front faceplate of most modern VCRs.

VCRs must be connected to a television set for play back. For this reason, VCRs are usually placed near the television set, often within a few feet of the floor. One disadvantage to this arrangement is that it puts the VCR within easy reach of small children. Small children can seriously damage a VCR by inserting foreign objects into the video cassette door or slot. Worse, children can injure their hands by sticking them into the video cassette door.

For these reasons, a child resistant VCR cover is desired which would deny children access to the video cassette door. One such VCR cover, described in U.S. Pat. No. 4,901,879, comprises a bracket and a door cover slidably mounted on the bracket. The bracket is affixed to the VCR by epoxy glue. A disadvantage of this cover is that it is difficult to remove the bracket, insofar as it is glued to the VCR. A further disadvantage is that the cover is not very attractive.

SUMMARY OF THE INVENTION

It is an objective of the present invention to provide a VCR cover that effectively prevents small children from accessing the video cassette door or slot.

A further object is to provide a VCR cover that can be easily installed and removed by an adult.

A still further object is to provide a VCR cover that is inexpensive and attractive.

Yet another object is to provide a VCR cover that can be installed without the use of glue, screws or the like.

THE DRAWINGS

DETAILED DESCRIPTION OF THE INVENTION

Figure 1:
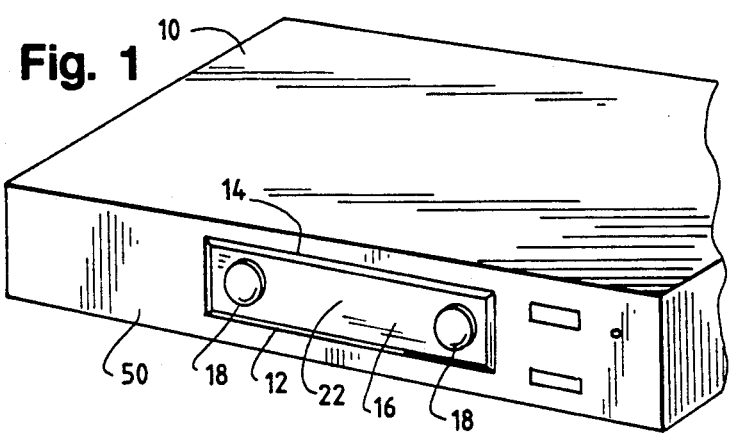
FIG. 1 is a perspective view of a VCR after the VCR cover of the present invention has been installed.

Turning to the drawings, there is shown in FIG. 1 a video cassette recorder (VCR) 10 with the VCR cover 12 of the present invention installed. The VCR cover 12 is of sufficient height and width to completely cover the video cassette door or slot 14, thereby denying access to the video cassette door 14 to small children unable to disengage the VCR cover 12.

Figure 3:
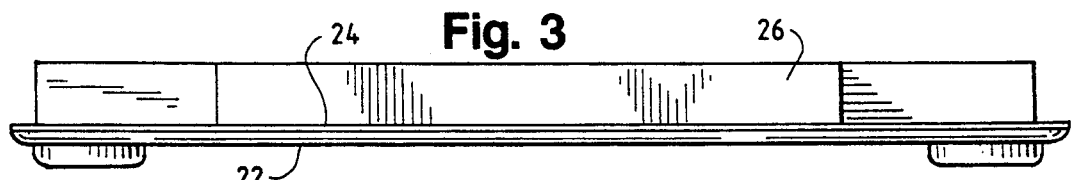
FIG. 3 is a top plan view of the cover plate of the VCR cover of FIG. 1.
Figure 2:
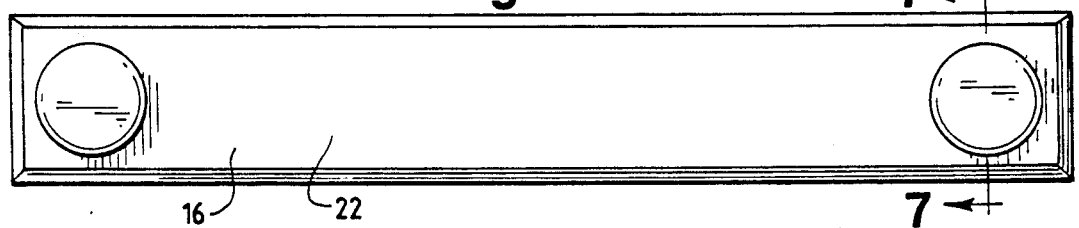
FIG. 2 is a front elevational view of the VCR cover of FIG. 1.
Figure 4:
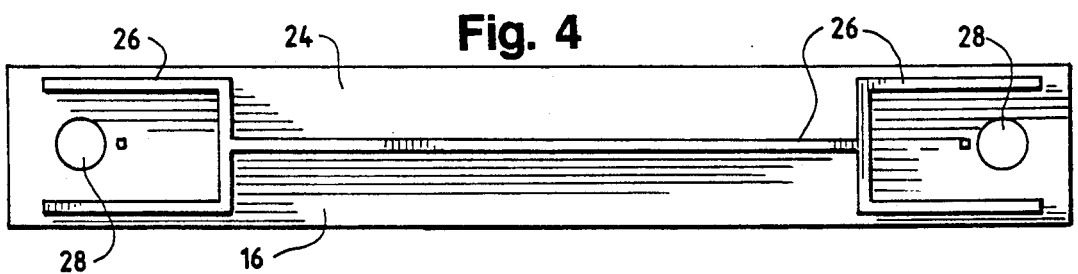
FIG. 4 is a rear elevational view of the cover plate of FIG. 3.
Figure 7:
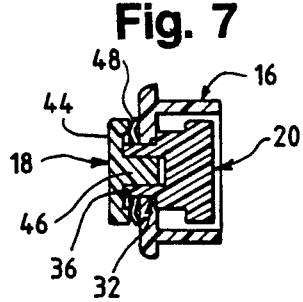
FIG. 7 is a cross sectional view of the VCR cover of FIG. 2, taken along line 7—7.
Figure 6C:
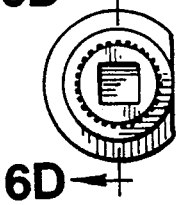
FIG. 6C is a rear elevational view of the cam of FIG. 6B.
Figure 6D:
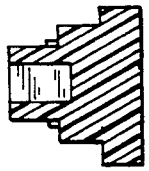
FIG. 6D is a cross sectional view of the cam of FIG. 6A, taken along line 6D—6D.
Figure 6A:
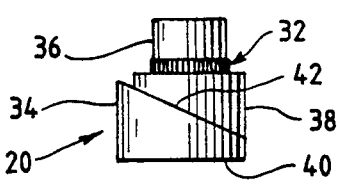
FIG. 6A is a top plan view of one cam of the VCR cover of FIG. 1.
Figure 6B:
FIG. 6B is a front elevational view of the cam of FIG. 6A.

In the preferred embodiment, the VCR cover 12 comprises a cover plate 16, a pair of knobs or grips 18, and a pair of cams 20 attached to the grips 18. As best shown in FIGS. 2-4, the cover plate 16 has a front side 22, a rear side 24 and ribs 26 which extend perpendicularly from the rear side 24. These ribs 26 have two functions. First, the ribs 26 push away the hinged plates (not shown) which cover the video cassette door 14 of most VCRs. Second, the ribs 26 serve as guides to help position the VCR cover 12 within the video cassette door 14. In order to position the VCR cover 12 within the video cassette door 14, the ribs 26 preferably have a height and width slightly smaller than the dimensions of the video cassette door 14.

Figure 5:
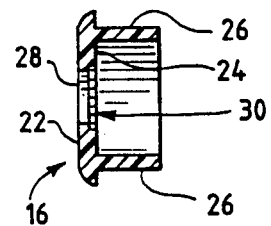
FIG. 5 is a cross sectional view of the VCR cover of FIG. 2, taken along line 7—7, after the grip and cam assembly has been removed.

The cover plate 16 has holes or openings 28 located at either end for accommodating the grip and cam assemblies. As best shown in FIG. 5, each hole 28 has a spline 30 which engages the corresponding spline 32 of a cam 20. When assembled, the cover plate spline 30 and the corresponding cam spline 32 cooperate in a gearlike fashion to prevent the cam 20 from rotating.

FIG. 6 is a top plan view of one of the cams 20. Each cam 20 comprises a body portion 34 and an axle 36. The body portion 34 is substantially cylindrical except for one side 38 which is flat. The body portion 34 also has a flat end 40 and a bevelled end 42. The axle 36 is perpendicular to the flat end 40 and extends away from the bevelled end 42 of the body portion 34. As already noted, the axle 36 has a spline 32 which engages the cover plate spline 30 when the VCR cover 12 is locked in place.

Each grip 18 comprises a knob portion 44 and an axle 46. In the assembled VCR cover 12, the grip axle 46 is inserted into the cam axle 36. Preferably, the grip axle 46 is glued to the cam axle 36, although the two may be held together by friction or other means. Springs 48 interposed between the grips 18 and the cover plate 16 force the grips 18 away from the cover plate 16 and force the spline 32 of each cam 20 to engage a corresponding 30 of the cover plate 16.

To install the VCR cover 12, simply insert the cover 12 into the video cassette door 14 and push and turn the knobs 18. When the VCR cover 12 is inserted, the ribs 26 on the cover plate 16 push back the hinged plates on the front of the video cassette door 14. Pushing and turning the grips 18 rotates the cams 20 so that the bevelled ends 42 engage the interior side of the VCR front plate 50 near either end of the video cassette door 14. The bevelled end 42 of the cams 20 acts like a screw in that the more one turns the grips 18, the tighter the VCR cover 12 is held in place. After releasing the grips 18, springs 48 under the knobs 18 push the cams 20 up to engage the cover plate splines 30 which locks the VCR cover 12 in place. The cams 20 can be rotated to fit most front loading VCRs.

In order to remove the VCR cover 12, the grips 18 must be pushed and turned simultaneously. Pushing the grips 18 down disengages the cam splines 32 from the cover plate splines 30. Turning the grips 18 disengages the cams 20 from the inside surface of the front plate 50. The cams 20 no longer engage the inside surface of the front plate 50 when the flat side 38 of both cams 20 is oriented parallel to the vertical sides of the video cassette door 14. This procedure is relatively easy for an adult, but sufficiently difficult for a small child to prevent him or her from gaining access to the video cassette door 14.

Other modifications and alternative embodiments of the invention are contemplated which do not depart from the spirit and scope of the invention as defined by the foregoing teachings and appended claims.

I claim as my invention:

1. In combination with a VCR having a front panel and a video cassette door in said front panel, said front panel having an exterior side and an interior side a VCR cover comprising:

a cover plate of sufficient height and width to cover the video cassette door, said cover plate having a front side and a rear side, a plurality of ribs extending perpendicularly from said rear side for positioning the cover plate in the video cassette door, and a pair of substantially circular holes, each of said holes having a spline;

a pair of cams which rotate to either engage or disengage the interior side of the VCR front panel, each of said cams comprising a substantially cylindrical body having a flat end and a bevelled end opposite said flat end, and axle perpendicular to said flat end and extending away from said bevelled end, and a spline circumferentially disposed about a portion of said axle for engaging said spline of said cover plate hole;

a pair of grips for rotating said cams, each of said grips comprising a knob and an axle extending perpendicularly away from said knob, said grip axle engaging said cam axle; and springs interposed between said grips and said cover plate.

2. The VCR cover of claim 1 in which the grip axle is glued to the cam axle.

3. The VCR cover of claim 1 in which the bevelled edge of each cam engages the interior side of the VCR front panel, whereby rotating the cams tightens the cover plate against the VCR front panel.

4. In combination with a VCR having a front panel and a video cassette door in said front panel, said front panel having an exterior side and an interior side, a VCR cover comprising:

a cover plate of sufficient height and width of cover the video cassette door;

means for positioning the cover plate in the video cassette door;

a pair of cams which rotate to engage the interior side of the VCR front panel thereby securing said cover plate to said front panel; and means for releasing said cover plate from engagement with said front panel;

wherein said cover plate has two holes, each cover plate hole has a spline, each of said cams comprises a body and an axle extending perpendicularly therefrom, and each cam axle has a spline which, when the VCR cover plate is locked in place, engages the corresponding cover plate spline.

5. The VCR cover of claim 4 in which said cover plate comprises a front side and a rear side, and said positioning means is a plurality of ribs extending perpendicularly from the rear side of said cover plate.

6. The VCR cover of claim 4 in which said releasing means is a pair of grips, each grip having a knob portion and engaging one of said pair of cams.

* * * * *